J. M. WARD.
PUNCTUREPROOF TIRE.
APPLICATION FILED AUG. 2, 1921.
1,431,069. Patented Oct. 3, 1922.
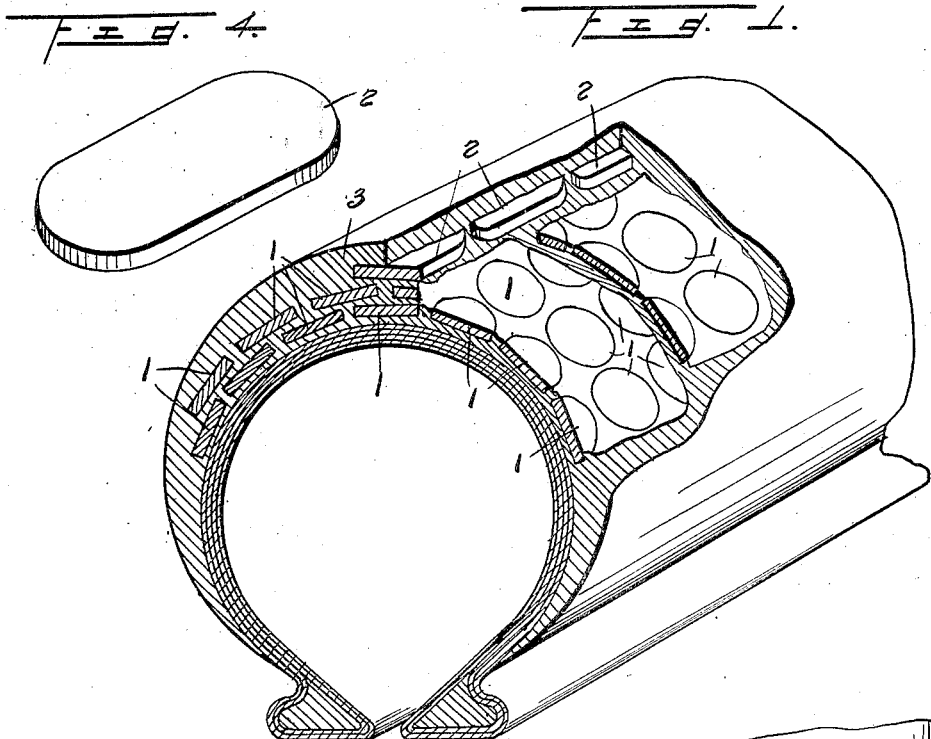
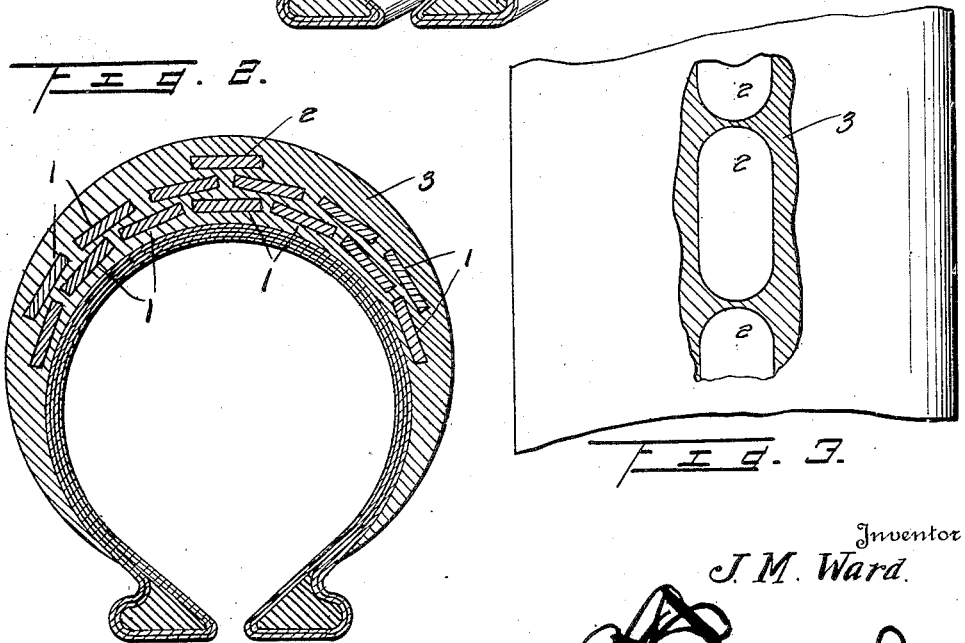
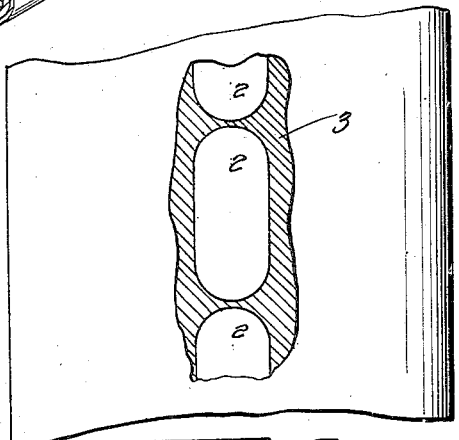
Inventor
J. M. Ward.
By *[signature]*
Attorney Patented Oct. 3, 1922.

1,431,069

UNITED STATES PATENT OFFICE.

JARRETT M. WARD, OF JARRETTSVILLE, MARYLAND.

PUNCTUREPROOF TIRE.

Application filed August 2, 1921. Serial No. 489,166.

*To all whom it may concern:*

Be it known that I, JARRETT M. WARD, a citizen of the United States, residing at Jarrettsville, in the county of Harford and State of Maryland, have invented certain new and useful Improvements in Punctureproof Tires; and I do hereby declare the following to be a full, clear, and exact description of the invention, such as will enable others skilled in the art to which it appertains to make and use the same.

The invention relates to soft tread tires, and more particularly to pneumatic tires, and has for its primary object to provide a tire of the pneumatic type which is practically proof against puncture, thereby obviating one of the chief objections urged against the use of pneumatic tires.

In accordance with the present invention the tread of a pneumatic tire is studded with protective elements which preferably are disposed in layers, the elements of one layer breaking joint with the adjacent layers and the several elements embedded in rubber which is vulcanized, the protective elements consisting of fibre which is tough and susceptible of having the rubber adhere thereto without any tendency to strip or peel. The material best adapted for the protective elements is known as horn fibre.

The invention furthermore provides a tire with an embedded breaker member comprising a plurality of closely related elongated elements of fibre.

Other objects and advantages will be apparent and suggest themselves as the nature of the invention is understood.

While the drawing illustrates an embodiment of the invention it is to be understood that in adapting the same to meet different conditions and requirements, various changes in the form, proportion and minor details of construction may be resorted to without departing from the nature of the invention.

Referring to the accompanying drawing forming a part of the specification,

Figure 1 is a perspective view of a portion of a pneumatic tire embodying the invention, portions being broken away to show more clearly the internal construction and arrangement of the protective elements.

Figure 2 is a transverse section of the tire.

Figure 3 is a detail view of the tread portion of the tire, a portion being broken away to show more clearly the relationship of the breaker member, and Figure 4 is a perspective view of one of the elongated elements comprising the breaker member.

Corresponding and like parts are referred to in the following description and designated in the several views of the drawing by like reference characters.

The body or carcass of the tire may be of any usual construction and comprises layers or plies of fabric cemented together and reinforced along their longitudinal edges with beads which may be of any form depending upon the type of the tire and the character of the rim for which the tire is designed. In accordance with the present invention the rubber applied to the outer side of the tire or casing has protective elements embedded therein, the same being of fibre of a nature to adhere to the rubber without stripping or peeling. The material best adapted and preferred in the formation of the protective elements is horn fibre. The protective elements cover the outer or tread side of the tire or casing and extend along the sides thereof a sufficient distance to prevent any sharp object from penetrating the tire and resulting in loss of air. These protective elements are indicated at 1 and consist of disks and the same may be of any thickness and diameter and may vary slightly in outline and when in position are closely related to obviate the passage of a sharp object therebetween. In the preferable construction the protective elements are provided in layers, as indicated most clearly in Figures 1 and 2. The elements 1 of one layer are disposed to break joint with the elements of the adjacent layer whereby to preclude the formation of an unobstructed passage through the rubber covering for a sharp object which would tend to puncture the tire. It is to be understood that any number of layers may be provided according to the size and structure of the tire.

As indicated most clearly in Figures 1 and 2, the tire or casing is provided with a breaker member, the same being centrally disposed and extending circumferentially of the tire. The breaker member comprises a plurality of elongated elements 2 disposed lengthwise of the tire with their ends in close relation. The protective elements 2 are likewise formed of fibre and are embedded in the rubber 3 applied to the outer side of the carcass or body of the tire to protect the same and sustain the wear.

By having the protective elements 1 and 2 formed of fibre they are extremely light and tough and will adhere to the rubber 3 without stripping or peeling thereby resulting in the formation of a tire which is comparatively light, wear resisting and practically proof against puncture.

Having thus described the invention, what I claim is:—

In combination, a tire including a carcass and rubber tread and side walls, a plurality of fibre protecting elements embedded in the tread and side wall and arranged in inner and outer layers and the elements of one layer overlapping the elements of the other layer to provide a continuous protector for the carcass, and a plurality of elongated fiber protecting elements embedded in the tread and extending circumferentially of the tire and arranged outwardly of the outer of layer of the first named elements.

In testimony whereof I affix my signature in presence of two witnesses.

JARRETT M. WARD.

Witnesses:
STANLEY B. ABBOTT,
J. WILMER CRONIN.